Aug. 12, 1969          A. W. BROWN ETAL          3,460,645
                        SAFETY BRAKE SYSTEM
Filed Nov. 6, 1967                              6 Sheets-Sheet 1
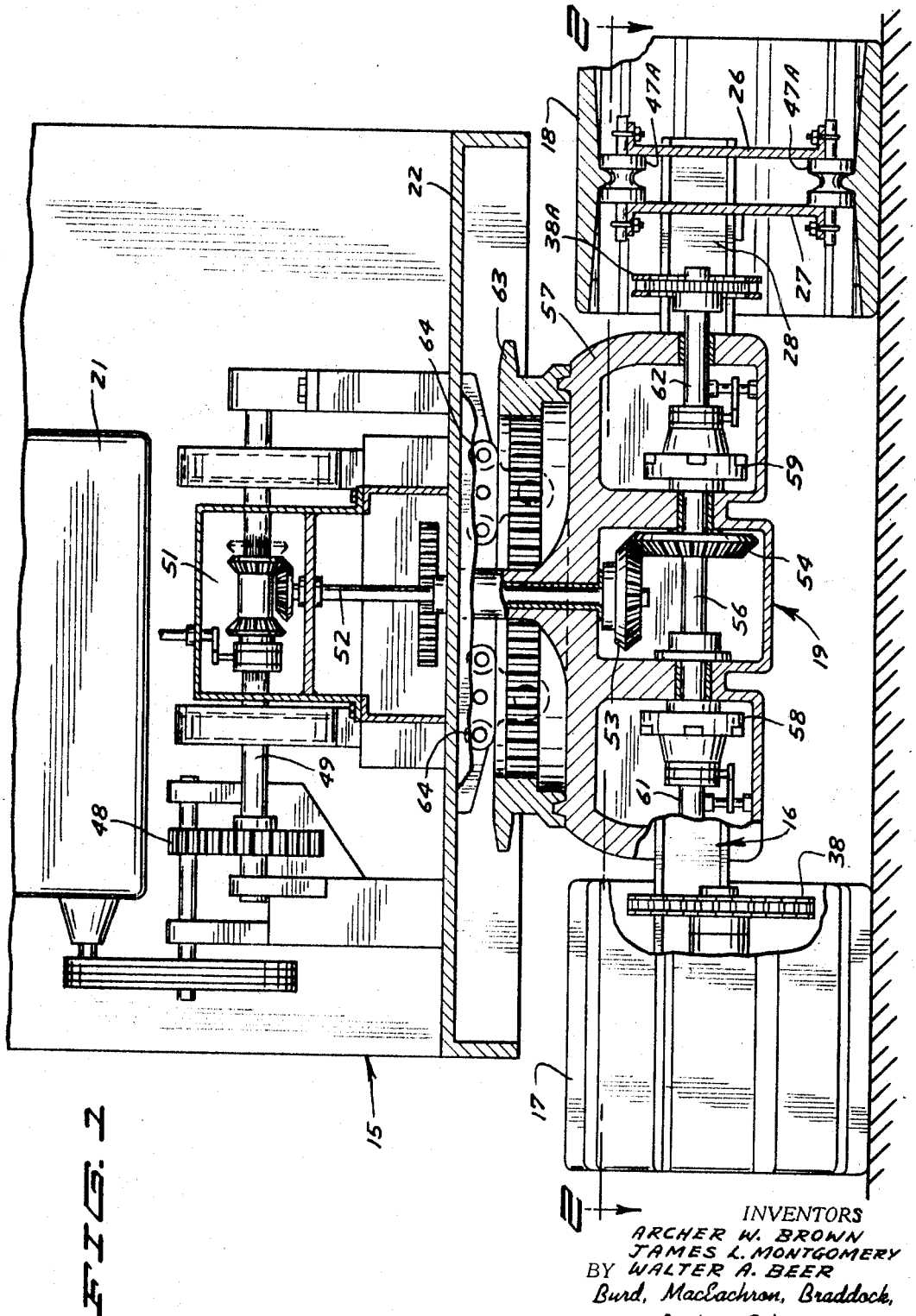
INVENTORS
ARCHER W. BROWN
JAMES L. MONTGOMERY
WALTER A. BEER
BY Burd, MacEachron, Braddock,
Bartz & Schwartz
ATTORNEYS

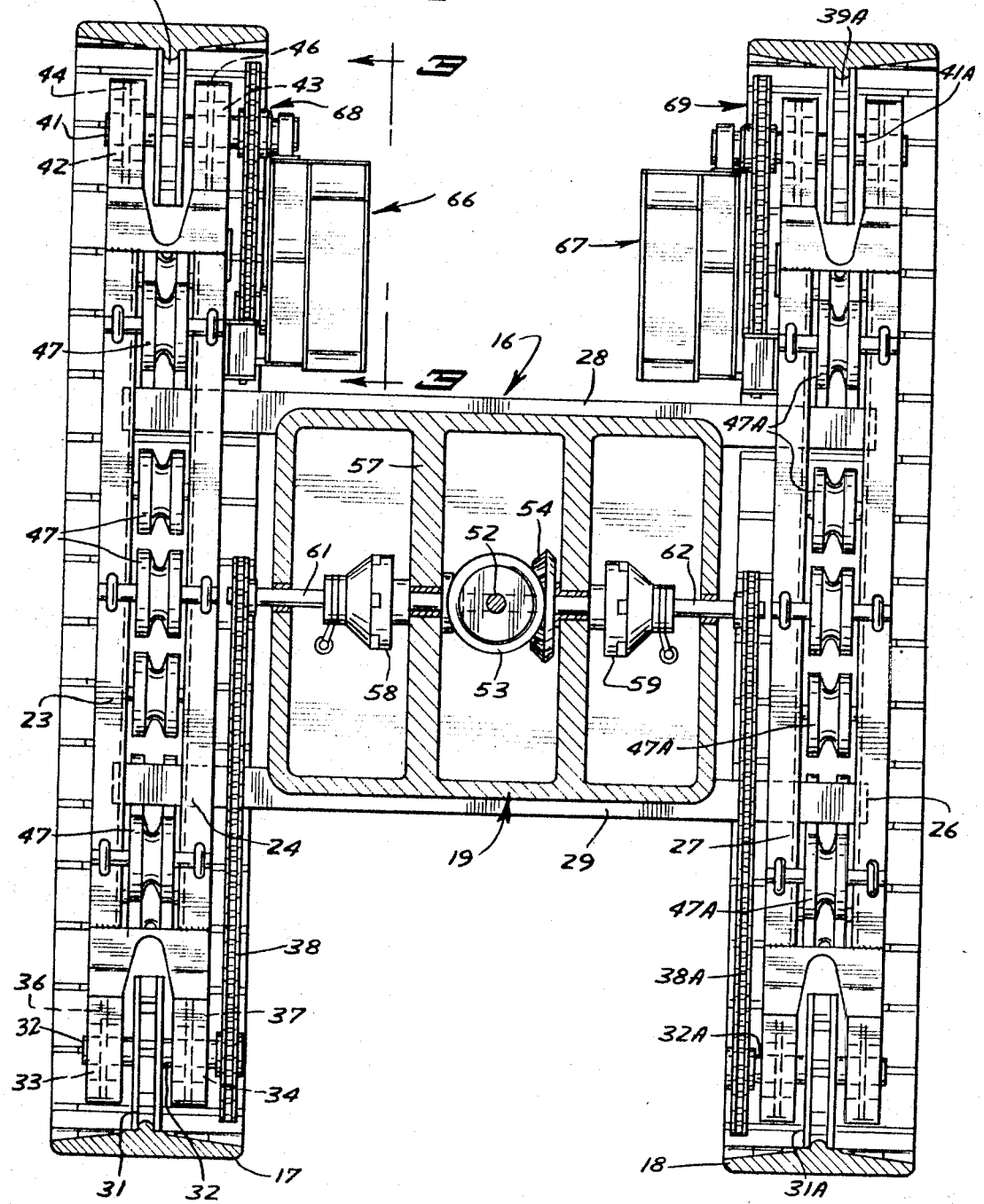

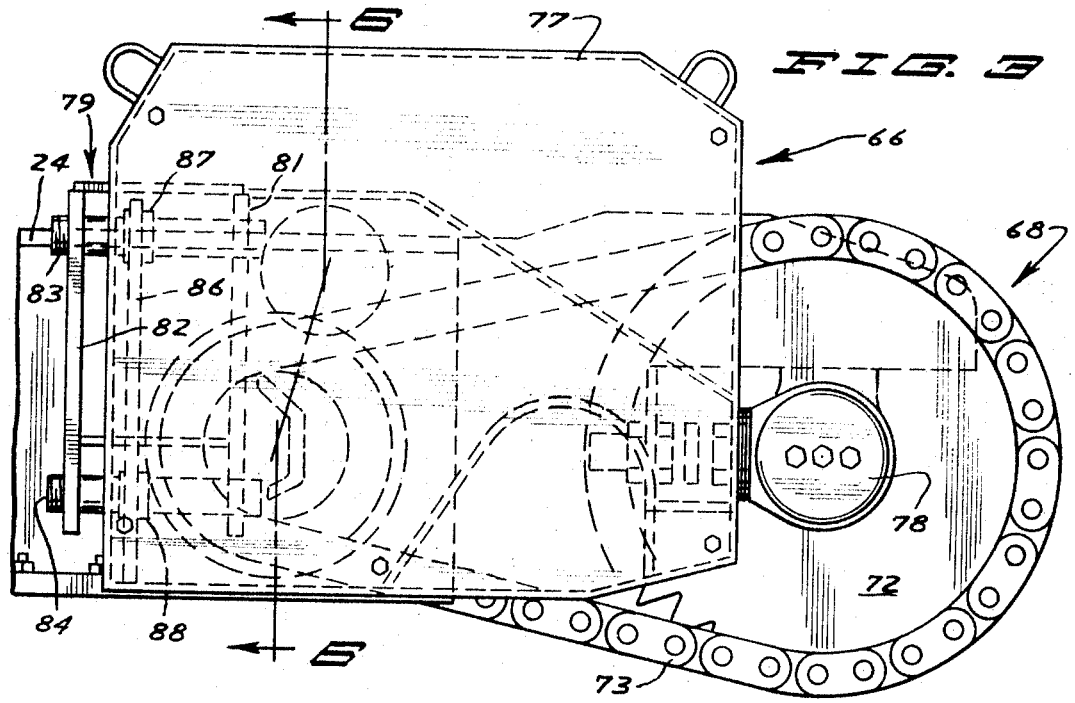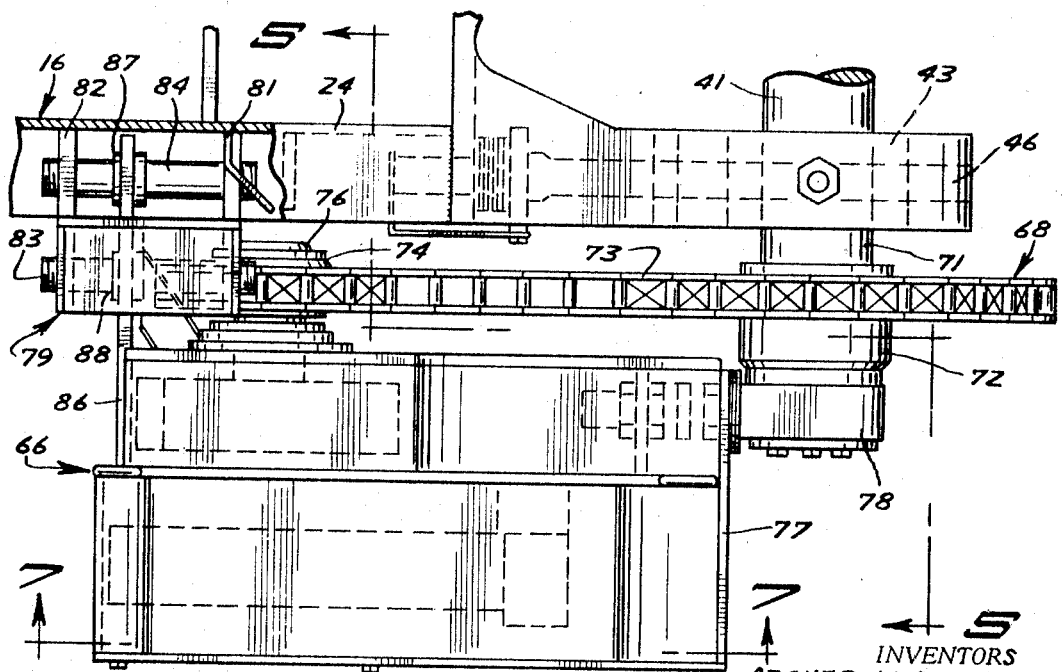

INVENTORS
ARCHER W. BROWN
JAMES L. MONTGOMERY
BY WALTER A. BEER
Burd, MacEachron, Braddock
Bartz & Schwartz
ATTORNEYS

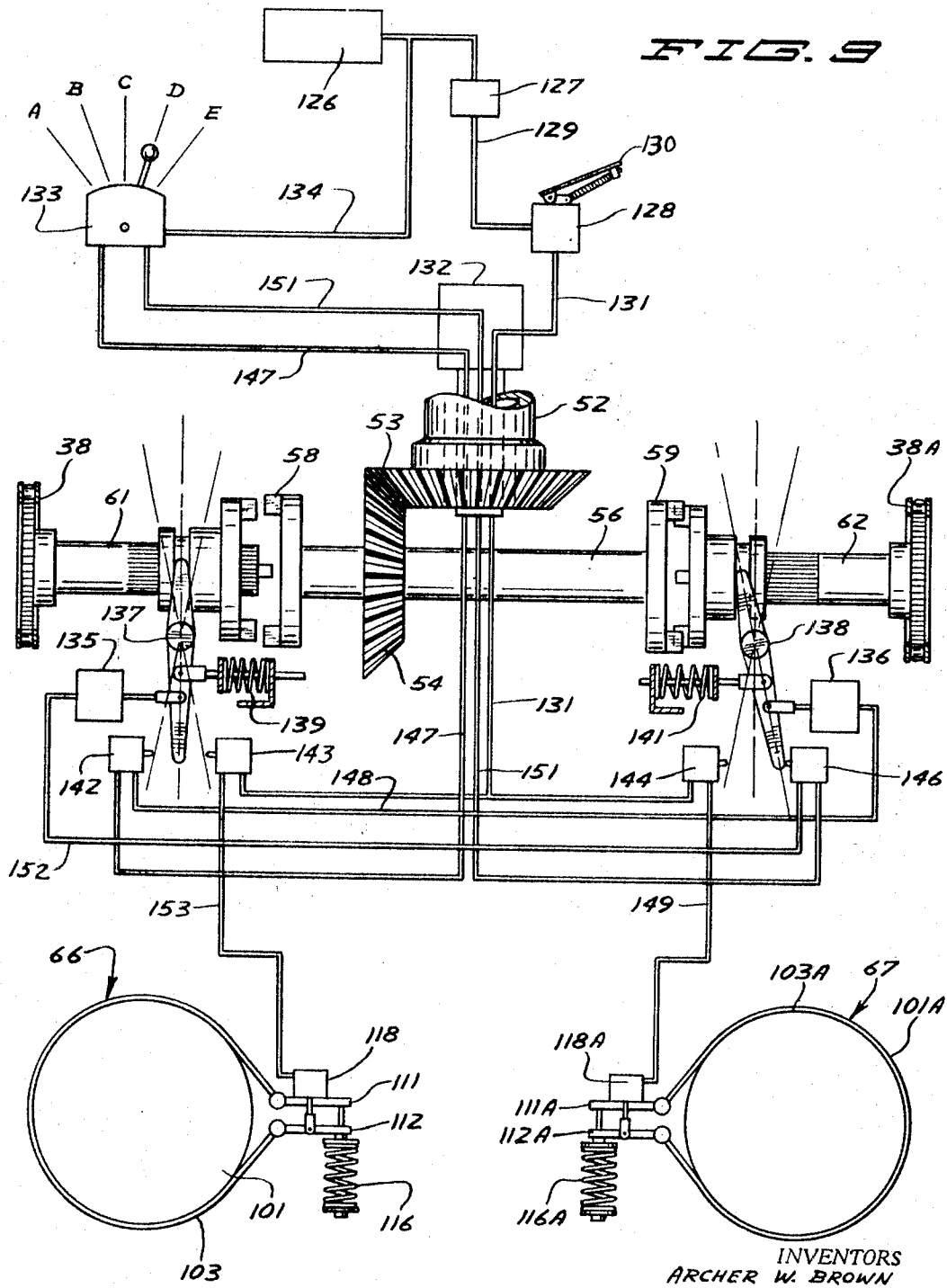

United States Patent Office 3,460,645
Patented Aug. 12, 1969

3,460,645
SAFETY BRAKE SYSTEM
Archer W. Brown, Minneapolis, and James L. Montgomery and Walter A. Beer, St. Paul, Minn., assignors to American Hoist & Derrick Company, St. Paul, Minn., a corporation of Delaware
Filed Nov. 6, 1967, Ser. No. 680,634
Int. Cl. B62d 11/00; F16d 67/02
U.S. Cl. 180—6.7                    19 Claims

ABSTRACT OF THE DISCLOSURE

A crawler tractor having a pair of endless tracks trained about drive tumblers and idler tumblers. A drive mechanism having a pair of clutches for each of the drive tumblers transmits power from an engine to the drive tumblers. Separate self-contained brake units are drivably connected through a torque reducing power transmitting chain and gear drive to the axles carrying the idler tumblers. Each brake unit has a fluid motor control operatively coupled to the control for the clutches so that when the clutch for one of the drives of the tracks is released the brake for the non-driven track is applied. The brake units are spring applied fluid pressure release band brakes operable to function independent of the drive mechanism for the tracks.

Background of invention

Conventional track type tractors have crawler drives which include propelling chains operable to transmit power to the drive sprockets or drive tumblers for each endless track. Braking systems have been employed with the separate drives for the tracks to aid in the steering and the control of the tractors. It is common practice to mount the brake rotor on the drive shaft used to transmit power through chains to the drive tumblers of the tracks. Examples of this type of drive and brake control for track type tractors are shown in the U.S. Patents No. 2,266,179, 2,281,288 and 2,641,343.

In use, machines with the conventional track drive and brakes have serious safety problems when working in rough mountainous terrain and in areas where the machine can move down a grade. A breakdown in the track drive mechanism, as a broken propelling chain, can cause the machine to fall uncontrolled when positioned on a grade or near an edge of a embankment. Conventional brakes are not effective as they require the drive connection created by the propelling chain between the brake and the track.

The safety brake of the present invention is operable to hold the machine in position even though one or both of the propelling chains break or there has been a failure in pneumatic control system of the machine. The safety brake operates independently of each track and in conjunction with the track steering controls making the steering and control of the machine easier and safer. The control of the safety brake is under the command of the operator at all times regardless of the operation or non-operation of other functions of the machine.

Summary of invention

The invention relates to a brake unit having a movable member drivably connected to the idler tumbler of a travel or track assembly of a track type machine or tractor. A power transmitting means connects the movable member of the brake unit with the idler wheel or tumbler of the track so that the movable member is driven with the tumbler. Associated with the movable member is a stationary braking member operable to brake and hold the movable member thereby locking the track in a fixed position. The stationary braking member is retained in support means used to mount the brake unit on the frame of the machine. The power transmitting means is used to drive a brake of adequate torque capability and enable the brake unit to fit in the available vertical clearance under the machine adjacent the idler end of the track. The brake unit has sufficient ground clearance to prevent damage by rocks and other ground level obstructions.

Another feature of the invention resides in the combination of a brake connected to the idler tumbler of a track with the pressure control system used in the drive mechanism of the track to steer the vehicle. The cylinder or motor for the brake is associated with the cylinder or motor used to operate the clutch in the drive mechanism for the track so that when the clutch is released the brake is selectively applied to lock the non-driven track. In the event of the failure of the control system, the brake will automatically be applied and thereby lock the track.

In the drawings:

FIGURE 1 is a transverse sectional view of a crawler tractor having the safety brake system of the invention;

FIGURE 2 is a sectional view taken along the line 2—2 of FIGURE 1;

FIGURE 3 is an enlarged sectional view taken along the line 3—3 of FIGURE 2;

FIGURE 4 is a plan view of FIGURE 3;

FIGURE 5 is a sectional view taken along the line 5—5 of FIGURE 4;

FIGURE 9 is a diagrammatic view of the brake and steering control system of the crawler tractor of FIGURE 1.

Figure 6:
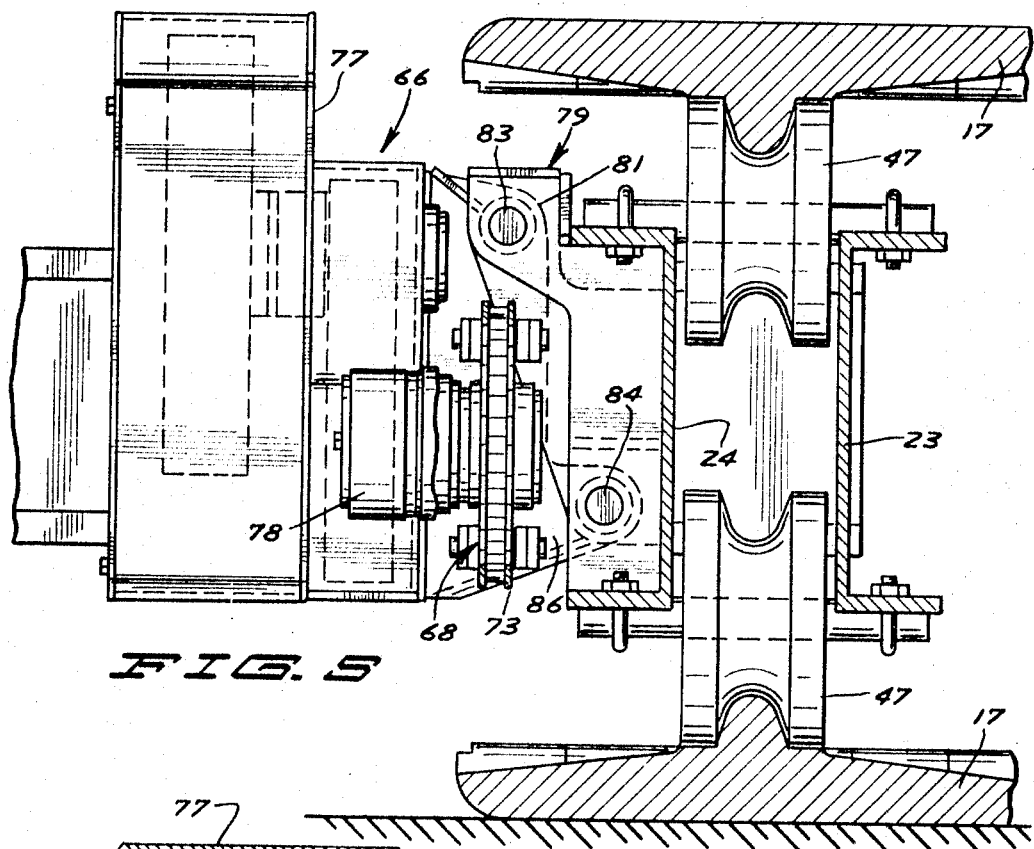
FIGURE 6 is an enlarged sectional view taken along the line 6—6 of FIGURE 3.

Referring to the drawings there is shown in FIGURES 1 and 2, a track propelled machine indicated generally at 15 having a frame 16 rotatably supporting longitudinal side endless tracks 17 and 18. Mounted on frame 16 is a power transmitting mechanism indicated generally at 19 forming part of the drive train connecting an engine 21 to the tracks 17 and 18. Engine 21 is located on a rotatable platform or deck 22. The machine 15 may be a track type tractor or earth handling equipment, as a crawler, excavator, crane, back hoe, or drag line, having a travel assembly or mobile track base.

Referring to FIGURE 2, frame 16 has a first pair of longitudinal side members 23 and 24 spaced from and located parallel to a second pair of longitudinal side members 26 and 27. A pair of spaced cross members 28 and 29 connect mid-portions of the side members to form a one piece generally H-shaped frame. The track 17 is movably mounted on the side members 23 and 24 by a drive tumbler or sprocket wheel 31 mounted on a transverse drive axle 32. Bearings 33 and 34 movably mounted in guideways 36 and 37 formed on the ends of side members 23 and 24 rotatably carry the drive axle 32 and position the drive tumbler between and adjacent the ends of the side members 23 and 24. Drive axle 32 projected in an inwardly direction is connected to a chain and sprocket drive 38 coupled to the power transmitting mechanism 19.

Located between and adjacent the opposite ends of side members 23 and 24 is an idler tumbler or sprocket 39 mounted on a transverse idler axle 41. The axle 41 is rotatably carried in bearings 42 and 43 mounted on longitudinal guideways 44 and 46. Bearings 33 and 34 and 42 and 43 are mounted on their respective guideways for longitudinal adjustment whereby the track tension may be adjusted. Rotatably mounted on the side members 23 and 24 between the drive tumbler 31 and idler tumbler 39 are a plurality of double flanged rollers 47 rotatably supporting the upper and lower runs of the track 17 between the tumblers 31 and 39.

The drive tumblers and rollers used to support the track 18 are identical with the drive and idler tumblers supporting the track 17. The identical parts associated with the side members 26 and 27 are identified with the same reference numerals having the suffix A.

As shown in FIGURE 1, the power flow from engine 21 to the tracks 17 and 18 is through a multiple stand roller chain drive to a speed reduction gear unit 48 driving a shaft 49. A bevel gear reversing gear train 51 couples shaft 49 to an upright vertical propel shaft 52 extended downwardly into the power transmitting mechanism 19. The lower end of shaft 52 carries a bevel gear 53 positioned in driving engagement with a bevel gear 54 mounted on a horizontal drive shaft 56. The gears 53 and 54 and drive shaft 56 are located within a base or housing 57 having bearings for the drive shaft 56. Coupled to opposite ends of shaft 56 are jaw clutches 58 and 59 used to drivably couple the ends of shaft 56 to outwardly directed shafts 61 and 62 respectively. The outer end of shaft 61 carries a drive sprocket of the chain and sprocket drive 38. In a similar manner the outer end of shaft 62 carries the drive sprocket of the chain and sprocket drive 38A.

The vertical propel shaft 52 extends through a bull gear 63 having an outwardly directed peripheral flange cooperating with a plurality of roller assemblies 64 rotatably mounting the deck 22. The drive mechanism which cooperates with the bull gear 63 for rotating the deck 22 about an upright axis is a conventional drive structure (not shown).

Returning to FIGURE 2, drivably associated with the idler tumblers 39 and 39A are separate braking units indicated generally at 66 and 67. The braking units 66 and 67 located adjacent the inside of side members 24 and 27 of the frame are drivably connected by separate power transmitting means 68 and 69 to the idler axles 41 and 41A respectively. Braking units 66 and 67 are identical in structure and operation. The following description is limited to the brake unit 66 as shown in detail in FIGURES 3 to 8. The parts of brake unit 67 that are common to brake unit 66 are identified with the same reference numerals having the suffix A.

Referring to FIGURES 3 and 4, brake unit 66 is an independent self-contained brake assembly located adjacent the side member 24 of frame 16. The power transmitting means 68 comprises a positive roller chain and sprocket drive connecting the idler tumbler shaft 41 to the brake unit. The shaft 41 has an outward extension 71 carrying a sprocket 72. A roller chain 73 extends around the sprocket 72 and over a sprocket 74 mounted on the input shaft 76 of the brake unit. The sprockets 72 and 74 and roller chain 73 comprise the positive power transmitting means 68. Rotatably mounted on shaft extension 71 outwardly of the sprocket 72 is a bearing 78 secured to the forward wall of a support or housing 77 for the brake unit 66.

A rear portion of housing 77 cooperates with a sliding mount indicated generally at 79 to movably support the housing on the frame 16. Sliding mount 79 comprises a pair of longitudinally spaced upright brackets 81 and 82 secured to the side member 24. Vertically spaced longitudinal pins 83 and 84 are carried by the brackets 81 and 82. The pins 83 and 84 project through guides or sleeves 87 and 88 mounted in a lateral flange 86 secured to the rear of housing 77. The mount 79 permits the brake unit 66 to move longitudinally with the idler shaft 41 to permit adjustment of the tension on the track without changing or adjusting the position of the brake unit. The bearing 78 along with the brake housing 77 provides a fixed support for the braking structure as well as the power transmitting means 68. As shown in FIGURE 5, the mount 79 and the bearing 78 hold the brake unit housing 77 in an elevated position relative to the surface of the ground adjacent the track 17 providing sufficient clearance or space for rocks and other obstructions which may be on the ground.

Referring to FIGURE 6, there is shown the brake unit 66 mounted on the side member 24 of the frame. Brake unit 66 is a self-contained brake assembly mounted within the housing 77. Housing 77 has spaced upright walls 89 and 91 carrying aligned bearings 92 and 93 rotatably mounting the input shaft 76. A spur gear 94 secured to the shaft 76 between the bearings 92 and 93 is in driving engagement with a spur gear 96 mounted on a shaft 97. A pair of bearings 98 and 99 rotatably mount shaft 97 on the walls 89 and 91. The wall 91 is removably secured to other portions of the housing to facilitate the assembly of the gear drive for the shaft 97. Walls 89 and 91 form a separate chamber for the gears 94 and 96 which may contain oil or other lubricants.

A rotor or movable member 101 is mounted on the end of shaft 97 projected outwardly from bearing 99. The outer peripheral section of rotor 101 has a cylinder or ring shape and a cylindrical outer braking surface 102. A brake stator or stationary braking member indicated generally at 103 extended around the rotor 101 is operable to frictionally engage the braking surface 102 thereby effecting a frictional braking of the rotor 101. Rotor and stator are located within a chamber separated from the gear trains 94 and 96 and enclosed by a removable cover 104.

Figure 7:
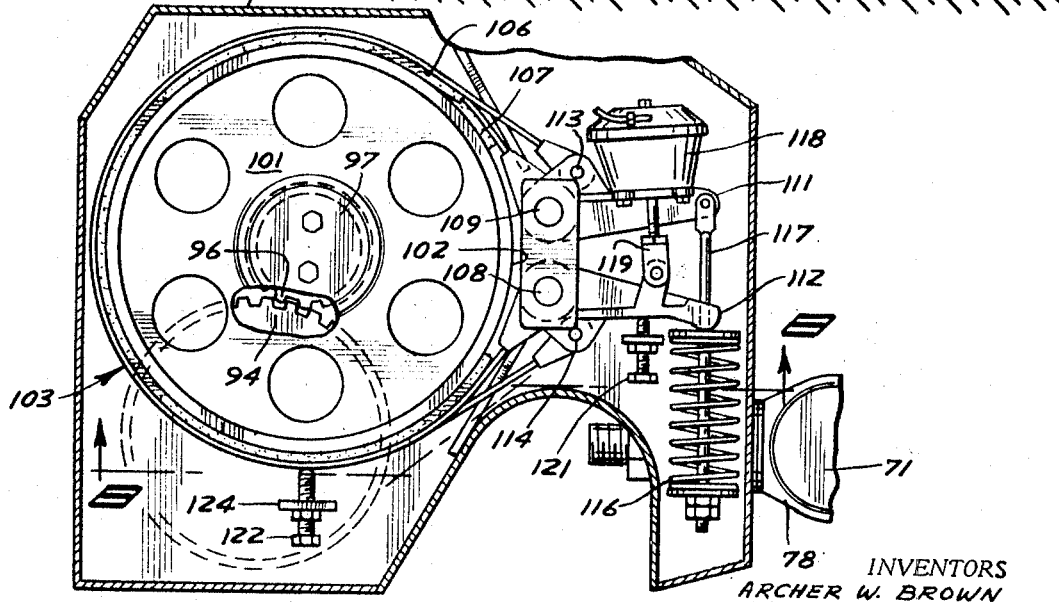
FIGURE 7 is a sectional view taken along the line 7—7 of FIGURE 4 showing the brake.
Figure 6:
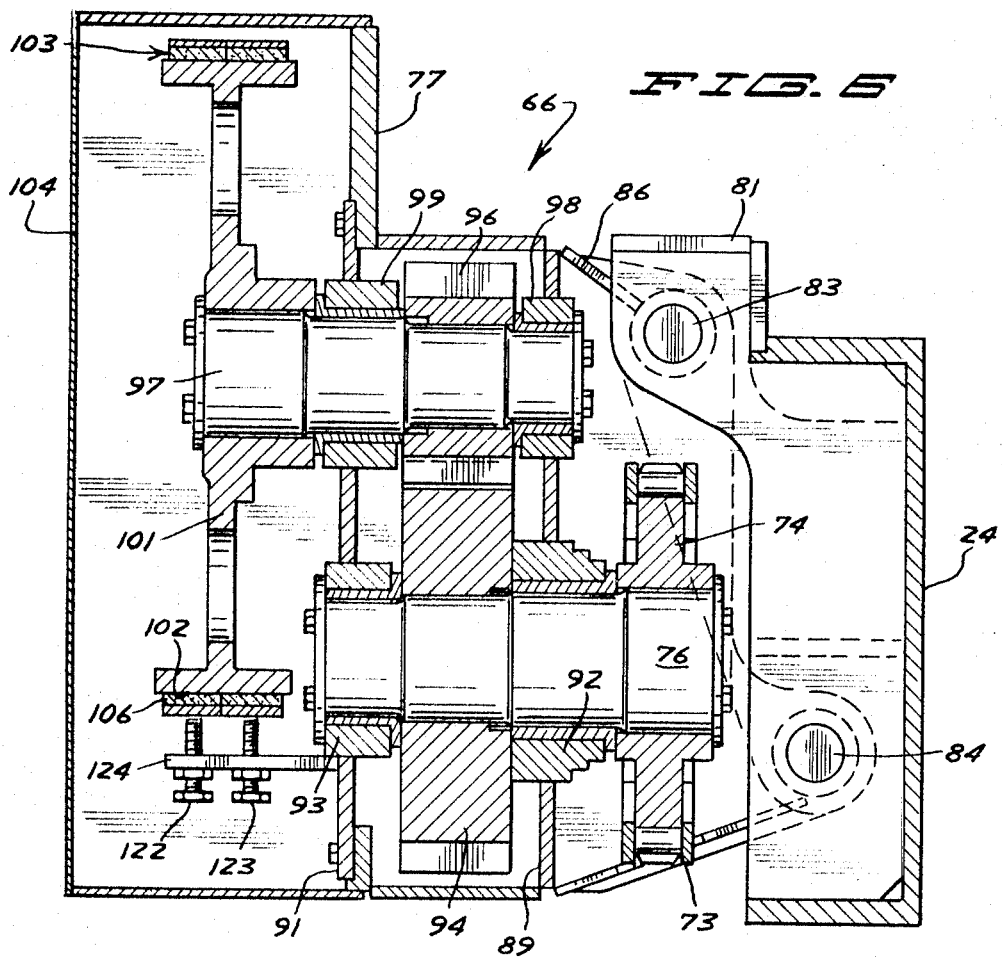
Figure 8:
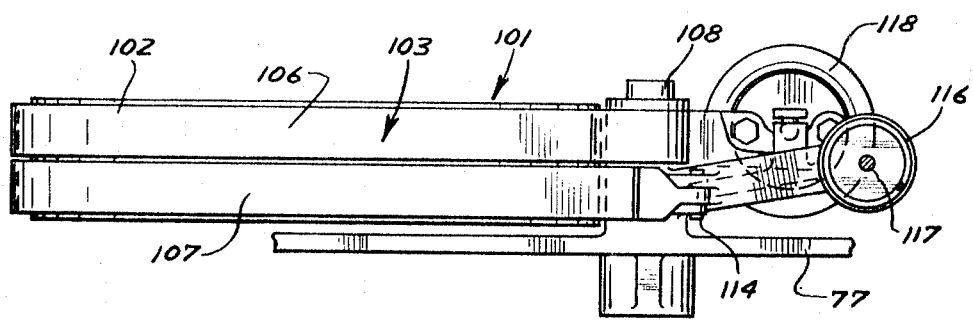
FIGURE 8 is a sectional view taken along the line 8—8 of FIGURE 7.

Referring to FIGURES 7 and 8, the stator 103 comprises a pair of circumferential bands 106 and 107 located in side-by-side relative relationship around the braking surface 102. The ends of bands 106 and 107 are mounted on anchor pins 108 and 109 projected from mounts in the housing 77. The anchor pins 108 and 109 pivotally mount brake levers 111 and 112 having pin connectors 113 and 114 for the opposite ends of the bands 106 and 107. The bands 106 and 107 are wrapped around the rotor 101 in opposite directions so that when the brake is applied it is equally effective against torque in either direction of rotation of the rotor 101. The brake is a spring applied, fluid cylinder or motor release band brake. A coil spring 116 connected with a rod 117 to the ends of levers 111 and 112 exerts a pressure on the levers to move the levers toward each other contracting the bands 106 and 107 in frictional engagement with the brake surface 102.

Fluid cylinder or motor 118 mounted on the lever 111 has a poston rod 119 pivotally connected to the lever 112. On the application of fluid pressure to cylinder 118 the levers move away from each other to a release position against the force of the spring 116. As long as the pressure in cylinder 118 is maintained, the brake will stay in the release position. As soon as the fluid pressure is released from cylinder 118, spring 116 will automatically apply the brake bands 106 and 107 to the braking surface 102. The slack or release clearance of the brake bands 106 and 107 is adjustable by a stop 121 which engages the midportion of lever 112 to fix the release position of both levers 111 and 112. Stop 121 functions in cooperation with a pair of upright stops 122 and 123, shown in FIGURE 6, to support the bands 106 and 107 in a release clearance relation with respect to the braking surface 102 of the rotor. As shown in FIGURE 6, a bracket 124 secured to wall 91 supports the adjustable stops 122 and 123 under the bottom segments of the band 106 and 107.

Referring to FIGURE 9, there is diagrammatically shown the control arrangement for the safety brake unit 66 and 67 and the fluid pressure tie in with the steering jaw clutch controls of the machine 15. The control system has a fluid pressure reservoir or source of air pressure 126 for supplying air to a parking valve 127 and a treadle valve 128 connected to the reservoir by a line 129. The air flows through treadle valve 128 into a line 131 and passes through a swivel air joint 132 located on the top end of the vertical propel shaft 52. Line 131 leads through interlock valves 143 and 144 and lines 153 and 149 to the fluid cylinders 118 and 118A for the braking units 66 and 67 respectively. On application of air pressure to the cylinders 118 and 118A the brakes are released. Treadle valve 128 is a reverse acting valve. When the foot treadle 130 is in the up position, full air pressure is delivered to the brake cylinders 118 and 118A. Locating the parking valve 127 in the set position cuts off the supply of air to the treadle valve 128 and vents the treadle valve thereby releasing the air pressure in the fluid cylinders 118 and 118A so that the springs 116 and 116A function to automatically apply the brakes.

The air pressure reservoir 126 is also connected to a five position steering valve 133 by a line 134. Valve 133 has an actuating lever movable to five positions indicated by the letters A to E. The valve 133 is used to control the clutches 58 and 59 in conjunction with the brake units 66 and 67 to steer the machine.

The clutches are operated with fluid cylinders or motors 135 and 136 which act on levers 137 and 138 respectively, connected to jaw clutch members slidably mounted on shafts 61 and 62. Springs 139 and 141 bias the levers against the action of the fluid cylinders to move the slidable clutch members to drive positions as shown by clutch 59. The clutch 58 is shown in the release position whereby cylinder 135 holds the lever against the biasing force of spring 139. The outer end of lever 137 is selectively engageable with interlocking valves 142 and 143 to control the flow of fluid, as air, to the brake fluid cylinders in conjunction with the operation of clutch 58. In similar manner, the outer end of lever 138 is associated with interlock valves 144 and 146 to control the brake units with the operation of the clutch 59. A line 147 leads from the steering valve 133 through the swivel air joint 132 to the interlock valve 142. Fluid flows through interlock valve 142 into a line 148 and fluid cylinder 136. A second line 151 connected to the control valve 133 is connected to interlock valve 146. A fluid from valve 146 is carried through a line 152 to fluid cylinder 135.

For straight ahead travel the steering valve 133 is placed in the central or C position. In this position the fluid cylinders 135 and 136 are both vented and the steering jaw clutches 58 and 59 are both held in engagement by their actuating springs 139 and 141 respectively. To control the safety brake units 66 and 67 air is supplied from air reservoir 126 through parking valve 127 and treadle valve 128 into line 131 to supply air pressure to the brake fluid cylinders 118 and 118A. This pressure operates the fluid cylinders to release the brake stators 103 and 103A. In this position, the foot treadle 130 is up to deliver air pressure to the brake fluid cylinders 118 and 118A. In the event of the failure of one of the drive chains or other portions of the drive mechanism, the operator of machine merely presses the foot treadle 130 of the valve 128 to vent the brake fluid cylinders 118 and 118A whereby the springs 116 and 116A automatically apply the brake units 66 and 67. The brake units being attached to the idler tumbler shafts by the double reduction drive power transmitting means, brakes the vehicle tracks without the use of any of the drive structures for the tracks.

With the steering valve 133 shifted to position D reduced air pressure is transmitted through interlock valve 146 to the clutch fluid cylinder 135. This shifts the left hand jaw clutch 58 into the neutral position. In this position, the treadle valve 128 still actuates both right and left hand brake fluid cylinders 118 and 118A. If the right hand clutch 59 had not been fully engaged, the interlock valve 146 would have cut off air pressure to cylinder 135 to prevent simultaneous disengagement of both jaw clutches.

When steering valve 133 is moved to the extreme position E, full air pressure is transmitted to cylinder 135 thereby shifting the left hand jaw clutch 58 to the brake set position actuating interlock valve 143. Valve 143 cuts off air pressure from the air line 131 and vents the fluid cylinder 118. With the steering valve in the position E, the treadle valve 128 controls only the right hand brake unit 67. The left hand brake unit remains in the brake applying position as fluid cylinder 118 is vented.

Positions B and A of steering valve 133 have the same positions as D and E respectively except that they disengage the right hand jaw clutch 59 and set or apply the right hand safety brake unit 67 instead of the opposite clutch and brake unit.

In use, when both clutches 58 and 59 are engaged, both of the brake units 66 and 67 are in the release position so as not to inhibit the operation of the drive for the tracks 17 and 18. In the turning of the machine, one of the clutches 58 or 59 is released to interrupt the drive to one track. The brake unit associated with the non-driven track is automatically applied when steering valve 133 is shifted to extreme positions A or E where full air pressure is supplied to the clutch cylinder thereby braking the track. The opposite track continues to move so as to turn the machine. In the event of the failure of the fluid pressure system, the brake units 66 and 67 will be automatically applied as there will be a reduction or a venting of the air from the brake fluid cylinders 118 and 118A. If the drive for one or both of the tracks is interrupted, as by a breakage of one of the drive chains 38 or 38A, the operator of the vehicle presses the foot treadle 130 of the valve 128. This will vent the brake fluid cylinders 118 and 118A with the result that the springs 116 and 116A automatically apply the brakes. Since the brakes are independent of the drive system, the tracks will be braked notwithstanding the failure of the drive mechanism for the tracks.

The embodiments of the invention in which an exclusive property or privilege is claimed are defined as follows:

1. In a track driven machine having a frame and an endless track trained about a drive tumbler and an idler tumbler the improvement of: brake means including a movable member and a stator means operable to brake the movable member, rotatable means secured to the idler tumbler, power transmitting means connecting the movable member with the rotatable means secured to the idler tumbler whereby the movable member is driven by the idler tumbler, and support means mounting the stator means on the frame.

2. In a track driven machine having a frame and an endless track trained about a drive tumbler and an idler tumbler the improvement of: brake means including a movable member and stator means operable to brake the movable member, power transmitting means connecting the movable member with the idler tumbler whereby the movable member is driven by the idler tumbler, support means mounting the stator means on the frame, and a transverse axle carrying the idler tumbler, and said power transmitting means including torque reducing drive means connecting the axle with the movable member.

3. The structure of claim 2 wherein the torque reducing drive means includes a chain and sprocket drive and a gear train connected to the chain and sprocket drive.

4. In a track driven machine having a frame and an endless track trained about a drive tumbler and an idler tumbler the improvement of: brake means including a movable member and stator means operable to brake the movable member, power transmitting means connecting the movable member with the idler tumbler whereby the movable member is driven by the idler tumbler, support means mounting the stator means on the frame, and a transverse axle carrying the idler tumbler, said support means having a bearing mounted on the axle and longitudinal slide means connecting the support means with the frame.

5. The structure of claim 4 wherein the support means includes a housing enclosing the brake means.

6. The structure of claim 5 wherein said power transmitting means includes a gear drive located within the housing and connected to the movable member of the brake means.

7. A brake assembly comprising: a frame, a rotatable member, a shaft driven by the rotatable member, brake means including a movable member, a stator member, and an actuator operable to selectively engage and disengage the stator member and the movable member to brake the movable member, power transmitting means operable to connect the movable member with the rotatable member, support means carrying the movable member, anchoring the stationary member of the brake means and mounting the power transmitting means, means connecting the support to the shaft, and a mount connecting the support to the frame.

8. The brake unit of claim 7 wherein said support means is a housing enclosing the brake means and at least part of the power transmitting means.

9. The brake unit of claim 7 wherein said power transmitting means includes a first shaft, a second shaft and power train means drivably connecting the first shaft with the second shaft, said movable member of the brake means drivably connected to said second shaft and bearing means rotatably mounting the first shaft and the second shaft on the support means.

10. The brake unit of claim 9 wherein said power train means is a gear train.

11. The brake unit of claim 9 wherein said support means is a housing enclosing the brake means and power train means, said first shaft projected outwardly from said housing and adapted to be drivably connected to the rotatable member.

12. The brake unit of claim 7 wherein said movable member is a rotor having a cylindrical braking surface, and said stationary member including means frictionally engageable with the braking surface to retard motion of the movable member.

13. The brake unit of claim 7 in combination with a rotatable member having a shaft driven by the rotatable member, and drive means connecting the shaft to the power transmitting means.

14. The brake unit combination of claim 13 wherein the drive means is a chain and sprocket drive.

15. The brake unit combination of claim 13 including means mounting the support means on the shaft.

16. The brake unit of claim 7 including means slidably connecting the mount to the frame.

17. In a track drive machine the combination of: a frame, endless tracks located adjacent opposite sides of the frame, said endless tracks including a track frame, a drive tumbler and an idler tumbler associated with each endless track, separate brake units mounted on said track frames and connected with each idler tumbler, each brake unit having a movable member drivably connected to the idler tumbler, a stator member and an actuator including a brake fluid motor operable to selectively engage and disengage the stator member with the movable member to brake the movable member, drive means including separate clutches for applying power to the drive tumblers to move the endless tracks, separate clutch fluid motors operable to selectively engage and disengage the clutches, and control means connected to the brake fluid motors and clutch fluid motors selectively operable to engage both clutches and release both brake units, to engage both brake units, or to release one clutch and engage the brake unit connected to the track associated with the released clutch.

18. The structure of claim 17 including torque reducing drive means connecting each movable member of the brake units with the associated idler tumbler.

19. The structure of claim 17 including brake springs cooperating with the brake fluid motors to brake the movable members of the brake units on reduction of fluid pressure in the brake fluid motors.

References Cited

UNITED STATES PATENTS

| 1,744,516 | 1/1930 | Whitacre | 180—6.7 |
| 2,791,918 | 5/1957 | Freusen | 180—6.7 |
| 3,338,325 | 8/1967 | Morse | 180—6.7 |

FOREIGN PATENTS

| 529,353 | 11/1940 | Great Britain. |
| 858,569 | 1/1961 | Great Britain. |

BENJAMIN HERSH, Primary Examiner

JOHN A. PEKAR, Assistant Examiner

U.S. Cl. X.R.

192—13; 305—9